United States Patent
Dafali et al.

(10) Patent No.: US 10,855,476 B2
(45) Date of Patent: Dec. 1, 2020

(54) EMBEDDED TEST CIRCUIT FOR PHYSICALLY UNCLONABLE FUNCTION

(71) Applicant: SECURE-IC SAS, Cesson-Sevigne (FR)

(72) Inventors: Rachid Dafali, Chartres-de-Bretagne (FR); Jean-Luc Danger, Antony (FR); Sylvain Guilley, Paris (FR); Florent Lozac'h, Trappes-en-Yveline (FR)

(73) Assignee: SECURE-IC SAS, Cesson-Sevigne (FR)

( * ) Notice: Subject to any disclaimer, the term of this patent is extended or adjusted under 35 U.S.C. 154(b) by 81 days.

(21) Appl. No.: 15/739,820

(22) PCT Filed: Jul. 1, 2016

(86) PCT No.: PCT/EP2016/065479
§ 371 (c)(1),
(2) Date: Dec. 26, 2017

(87) PCT Pub. No.: WO2017/001650
PCT Pub. Date: Jan. 5, 2017

(65) Prior Publication Data
US 2018/0183613 A1    Jun. 28, 2018

(30) Foreign Application Priority Data
Jul. 1, 2015    (EP) .................................... 15306063

(51) Int. Cl.
*H04L 29/06*    (2006.01)
*H04L 9/32*    (2006.01)
(Continued)

(52) U.S. Cl.
CPC .............. *H04L 9/3278* (2013.01); *G09C 1/00* (2013.01); *H04L 9/0866* (2013.01); *H04L 2209/12* (2013.01); *H04L 2209/26* (2013.01)

(58) Field of Classification Search
None
See application file for complete search history.

(56) References Cited

U.S. PATENT DOCUMENTS 9,444,618 B1 *    9/2016    Trimberger ............. H04L 9/002
2011/0055649 A1 *    3/2011    Koushanfar .......... G06F 21/577
                                                        714/729
(Continued)

FOREIGN PATENT DOCUMENTS

WO    2014048631 A1    4/2014
WO    2015/031683 A1    3/2015

OTHER PUBLICATIONS

Zouha Cherif et al: "Physically Unclonable Function: Principle, Design and Characterization of the Loop PUF", Nov. 3, 2014 (Nov. 3, 2014). Trusted Computing for Embedded Systems, Springer, pp. 115-133. (Year: 2014).*

(Continued)

*Primary Examiner* — Andrew J Steinle
(74) *Attorney, Agent, or Firm* — Meagher Emanuel Laks Goldberg & Liao, LLP

(57) ABSTRACT

There is disclosed a silicon integrated circuit comprising a Physically Unclonable Function and an online or embedded test circuit, said online test circuit comprising one or more circuit parts being physically adjacent to said PUF and said one or more circuits embodying one or more tests which can be performed to determine one or more quality properties of said PUF or otherwise characterize it. Different tests with specific associated method steps are described.

14 Claims, 6 Drawing Sheets

(51) Int. Cl.
*H04L 9/08* (2006.01)
*G09C 1/00* (2006.01)

(56) References Cited

U.S. PATENT DOCUMENTS

2014/0376717 A1* 12/2014 Macchetti ................. H04L 9/14
380/28
2015/0046718 A1* 2/2015 Meyer ................... H04L 9/0866
713/189

OTHER PUBLICATIONS

International Search Report and Written Opinion for PCT/EP2016/065479, dated Sep. 19, 2016.
Zouha Cherif et al: "Physically Unclonable Function: Principle, Design and Characterization of the Loop PUF", Nov. 3, 2014 (Nov. 3, 2014). Trusted Computing for Embedded Systems, Springer, pp. 115-133.
Maiti Abhranil et al: "The Impact of Aging on a Physical Unclonable Function", IEEE Transactions on Very Large Scale Integration (VLSI)Systems, IEEE Service Center, Piscataway, NJ, USA, vol. 22, No. 9, Sep. 1, 2014 (Sep. 1, 2014), pp. 1854-1864.
Verbauwhede I et al: "A soft decision helper data algorithm for SRAM PUFs", Information Theory, 2009, ISIT 2009. IEEE International Symposium on, IEEE, Piscataway, NJ, USA, Jun. 28, 2009 (Jun. 28, 2009), pp. 2101-2105.
European Office Action issued in corresponding application EP 15 306 063.7, dated Sep. 16, 2019.

* cited by examiner

EMBEDDED TEST CIRCUIT FOR PHYSICALLY UNCLONABLE FUNCTION

TECHNICAL FIELD

This patent relates to the field of digital data processing and more particularly to methods and systems for handling a Physically Unclonable Function.

BACKGROUND

A Physically Unclonable Function (acronym PUF, plural PUFs) is a physical entity which is embodied in a physical structure and which is the same in each physical instantiation of said structure and which generates a specific output or response when provided with an input, or challenge. The value of said specific output being specific to each instantiation of the physical entity embodied within a device. A PUF takes advantage of the variance of conditions in the manufacturing process of many identical devices. A PUF can be incorporated in a CMOS integrated circuit. To some extent, a PUF may be considered as the analog of a fingerprint of the device. A PUF can be used in various contexts (e.g. authentication of chips or goods it is attached to, generation of cryptographic keys or seeds of PRNG, etc).

In particular, a PUF is a physical function (not a mathematical function) which maps a digital "Challenge" to a digital "Response". A challenge is a vector of bits. Running a PUF with a set of challenges produces a unique and non-predictable set of responses. It is required that the PUF yields a deterministic answer for the same challenge. This determinism might be flawed by noise as the exploited phenomenon comes from physical sources, such as slight differences between logic gates.

When handling PUFs, one technical problem to solve consists in assessing the quality of a PUF device. Certain aspects or properties of this quality can be determined (e.g. measured): reliability, security, etc. For example, the reliability of a PUF corresponds to its ability to perform its required functions under stated conditions for a specified period of time.

Existing approaches for testing PUFs are limited. In particular, on-device and in-field tests are not carried out. The patent literature does not provide satisfactory solutions. For example, patent document US 20110055649 entitled "Testing security of mapping functions" discloses methods, apparatus and articles for testing the security of a mapping function—such as a Physically Unclonable Function (PUF)—of an integrated circuit (IC). In various embodiments, one or more tests may be performed. In various embodiments, the tests may include a predictability test, a collision test, a sensitivity test, a reverse-engineering test and an emulation test. In various embodiments, a test may determine a metric to indicate a level of security or vulnerability. In various embodiments, a test may include characterizing one or more delay elements and/or path segments of the mapping function. These approaches present limitations.

There is a need for advanced methods and systems to handle a PUF and in particular to assess one or more of its properties.

SUMMARY

There is disclosed a silicon integrated circuit comprising a Physically Unclonable Function and an online or embedded test circuit, said online test circuit comprising one or more circuit parts being physically adjacent to said PUF and said one or more circuits embodying one or more tests which can be performed to determine one or more quality properties of said PUF or otherwise characterize it. Different tests with specific associated method steps are described.

Advantageously, embodiments of the invention allow a user or a machine (e.g. software component) to determine or measure or otherwise assess "properties" or "attributes" of a PUF. Said actions can be performed by a user or can be performed by a machine in an automated workflow. For example, embodiments of the invention allow a machine to characterize a PUF in a factory. A "user" designates a plurality of roles. For example, a user can act as an "administrator" who can configure and perform tests with service challenges according to embodiments of the invention, store responses, configure thresholds, define or measure reliability areas, etc. A user can also be a "end user" who can use the PUF in order to authenticate a challenge-response or generate a key, etc.

Advantageously, since one or more properties of a PUF can be determined or measured or assessed, the associated PUF can be further "controlled" or "managed" or otherwise "handled" downstream (rejected, revoked, tracked, monitored, etc).

For example, the reliability of a PUF once measured can be guaranteed by various mechanisms. Such reliability is not estimated "on-device" and "in-the-field" by existing approaches, which leads to several drawbacks (e.g. confidence that a circuit still implements its function, behavior and reliability over time, operation under adverse conditions and/or in harsh environmental conditions, etc.). For example, in US20110055649, the proposed analysis and test circuit is not embedded, therefore requiring a rather complex and external test circuitry and analyzer tool, as shown in FIGS. 1, 5 and 7 of the patent document. Another limitation is that the analysis does not exploit any particular challenge whose response presents remarkable properties to assess the PUF quality.

In addition, the feature of an «embedded» test is particularly advantageous versus the sensitivity—if not fragility—of a PUF. Known tests of the state of the art generally imply some form of coupling or hardware intrusion which can be detrimental to the PUF e.g. which can introduce perturbations and further lead to false measures. By contrast, an embedded test adjacent to (or intermingled with) the PUF forms an integral part of the global circuit, thereby providing a non-perturbative and readily accessible test solution.

Advantageously, determined properties of the PUF can be measured and be further notified to a user or a human operator or a supervisory system so that (appropriate) decisions can be taken downstream (for example, the PUF device can be rejected or revoked, new security measures or procedures can be taken, associated relevant knowledge can be gathered in order to build better products, etc).

Advantageously, embodiments of the invention can also monitor the functionality of a PUF device over time, hence allowing the production of useful computation and log (e.g. access) statistics. In particular, corresponding data can be reported to a supervision center, which for example can correlate the evolution of the functionality of the PUF device. The awareness of the chip operator or user can be modified (e.g. alerts, etc). In an embodiment, an operator or the supervision center can temporarily reject or revoke a product sample if one or more test sequences fail. An operator or the supervision center can gather knowledge for future better products. An operator or the supervision center can be advised that the environmental conditions are abnormally "harsh". The operator may decide to revoke the device in anticipation of impending failure whilst the device is still ostensibly functional, thereby avoiding additional costs and consequences of undetected failure.

Advantageously, the PUF can be used as a sensor to detect perturbation attacks. Indeed, if the environment of the device is changing (due to a malevolent attack who aims at creating faulty computations), then the PUF properties might change. This can be monitored, and used to infer the likelihood of an attack. Such a usage of the PUF is useful, in that it allows to take advantage of it even when the functionality of the PUF (generation of keys, seeding of pseudo-random number generators, authentication, etc.) is not needed, for another purpose (ambient sensor). Moreover, such a use as a sensor can bring an attack attempt detection, which is orthogonal to other types of sensors. Eventually, such way of using the PUF might hint of an attack preparation, even if the stress applied by the attacker is not strong enough to actually trigger a concrete malfunction in the circuit.

BRIEF DESCRIPTION OF DRAWINGS

Embodiments of the present invention will now be described by way of example with reference to the accompanying drawings in which like references denote similar elements, and in which.

DETAILED DESCRIPTION

Figure 1:
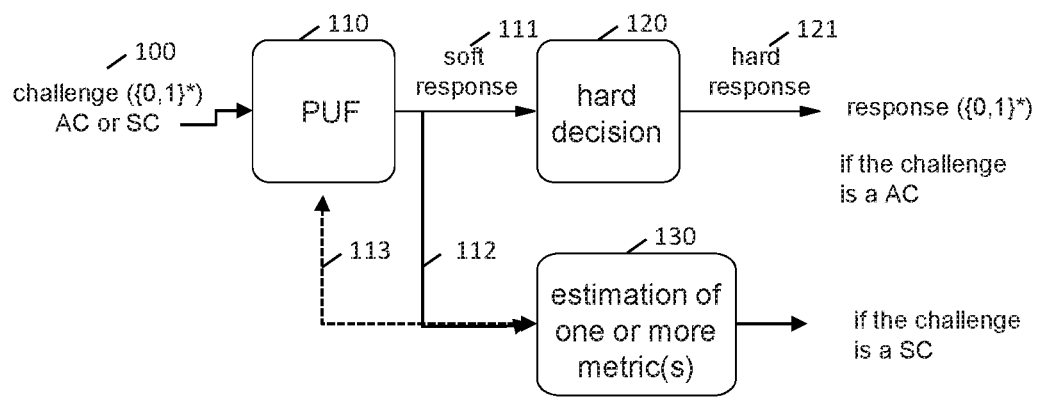
FIG. 1 illustrates examples of steps of the method according to the invention.

Definitions of terms are now introduced.

Running a PUF with a Challenge causes said PUF to output a Response.

The PUF can be run with a plurality of challenges, thus outputting associated responses which characterize the PUF.

In an aspect of the invention, challenges are partitioned into service challenges (SC) and application challenges (AC). In mathematics, a "partition" of a set is a grouping of the set's elements into non-empty subsets, in such a way that every element is included in one and only one of the subsets. This in particular implies that the sets of SCs and ACs are disjoined. A challenge is a "service" challenge or else is an "application" challenge. As application challenges are well defined in the literature, the definition of service challenge is a contrario well defined (a SC is a challenge which is not an AC).

Further clarifications are described.

A "service" challenge according to the invention is used to assess one or more PUF attributes, for example its quality.

"Application" challenges are known in the prior art. These challenges are used for classical PUF applications. Application challenges can serve two purposes: a) key generation or b) challenge-response authentication. Application challenges are used to assess the functionality of the PUF (e.g. authentication of chips or goods, generation of cryptographic keys or seeds of PRNG, etc.). Application challenges can be generated at design stage and/or at profiling stage (for example just after manufacturing). At design stage, the PUF designer does know the architecture (and/or has a good understanding of the system behavior). Knowing the architecture allows the user to find or identify challenges with well-defined properties. A criterion for example can be such that the Hamming weight of the challenge impacts the PUF response.

In an aspect of the invention, there are defined "service" challenges.

The difference between an application challenge and a service challenge essentially comes from the response type of the PUF. For an application challenge, an application response corresponds to a "fingerprint" or "signature" of the device, relying on the "uniqueness" property of the PUF. For a service challenge, the associated service response corresponds to a value used to assess the "normal" behavior of the PUF, i.e. without giving necessarily much information about the uniqueness of the PUF. A service response is then compared with an expected response according to the test type. For instance the "total failure test" according to embodiments of the invention can use service challenges associated with service responses presenting the maximal absolute values. If the service responses during the PUF execution are very low values, that likely reflects an abnormal or otherwise suspicious behavior. Most of the service challenges are generated at profiling stage.

Hence a "service challenge" is a challenge which is used to assess the quality of the PUF. The service challenges are used for carrying out the test sequences (e.g. entropy, noise level, reliability, total failure, etc).

The value of a challenge run by a PUF controls the behavior of said PUF, and thus controls the response. A service challenge is associated with a response, which response is associated with a specific, known and reproducible behavior of the PUF.

The term "behavior" designates the way something (such as a machine or substance) functions or reacts. An application challenge allows getting a response without any information regarding the behavior of the PUF. A service challenge provides a response which reflects or is caused by the behavior of the PUF (for example which comprises indicia/ metrics which can be used to estimate or determine thresholds which are used by the different tests according to the invention).

According to a specific definition, a service challenge exercises the PUF in some corner cases in order to find and measure the limits of the envelope within which the PUF may operate, including degradations over time.

The distinction between service challenges SC and application challenges AC can be further explained in terms of hardware (physical considerations).

In terms of hardware, responses to service challenges necessarily must be stored, be it ephemeral or not, so that metrics/measures can be derived thereof (no instantaneous computation is possible).

The response to service challenges can be stored by various means. In some embodiments, the storage can be performed in a non-volatile memory, for example in order to perform reliability or aging tests. In some other embodiments, a volatile memory (e.g. SRAM) can be used, for example for randomness tests (wherein there is assessed whether the different responses to different challenges are sufficiently different).

By contrast, the response to an application challenge must not be stored for security reasons: it is the core function of a PUF to be able to restitute a response given an application challenge (the memory is "distributed" in the PUF hardware itself). Even further, it is a fundamental security "requirement" for the PUF to not store the response separately (i.e. other than in or by itself). These considerations incidentally justify the fact that service challenges and application challenges cannot overlap (a partition into two sets presents no common part)

Various embodiments are now described.

There is disclosed an integrated circuit comprising a PUF and a test circuit, wherein computer logic is embedded in, stored on or accessible by the test circuit, said computer logic being configured for implementing one or more service challenges, a service challenge generating a service response, which can be compared to one or more responses to determine one or more deviations from a predefined response pattern.

There is disclosed an integrated circuit comprising a PUF and a test circuit, wherein computer logic is one of embedded in, stored on or accessible by the test circuit, said computer logic being configured for implementing a service challenge, a service challenge generating a service response, said service response being comparable to one or more service responses to determine a deviation from a predefined pattern.

There is disclosed an integrated circuit comprising a PUF and a test circuit, wherein computer logic is embedded in, stored on or accessible by the test circuit, said computer logic being configured for implementing one or more service challenges, a service challenge generating a soft service response, which can be compared to one or more soft responses to determine one or more deviations from a predefined response pattern.

There is disclosed an integrated circuit comprising a PUF and a test circuit, wherein computer logic is embedded in, stored on or accessible by the test circuit, said computer logic being configured for implementing one or more service challenges, a service challenge generating a soft service response, which can be compared to one or more soft responses to determine one or more deviations from a predefined response pattern.

There is disclosed an integrated circuit comprising a PUF and a test circuit, wherein computer logic is embedded in, stored on or accessible by the test circuit, said computer logic being configured for implementing a service challenge, said service challenge generating a response comparable to one or more responses of the PUF to determine one or more deviations.

There is disclosed an integrated circuit comprising a PUF and a test circuit, wherein computer logic is embedded in, stored on or accessible by the test circuit, said computer logic being configured for implementing a service challenge, said service challenge generating a service response when run by the PUF and said computer logic being configured to determine a deviation from a predefined response pattern.

There is disclosed an integrated circuit comprising a PUF, a test circuit and a non-volatile memory, wherein computer logic is one of embedded in, stored on or accessible by the test circuit, said computer logic being configured for executing a plurality of service challenges, a service challenge generating one service response, the plurality of service responses obtained after execution of the service challenges by the PUF being comparable or compared to a plurality of responses stored in the non-volatile memory.

There is disclosed an integrated circuit comprising a PUF, a test circuit and a non-volatile memory, wherein computer logic is one of embedded in, stored on or accessible by the test circuit, said computer logic being configured for executing a service challenge by the PUF, a service challenge generating a service response, wherein said service response is comparable or is compared to a plurality of service responses stored in the non-volatile memory.

The responses can be predefined responses. The responses can be previously collected or stored responses (for the same PUF). The responses can be known responses (for example as retrieved from a database).

In a development, the predefined response pattern is embedded in, stored on or accessible by the test circuit.

In a development, the predefined response pattern is defined by one or more metrics and one of more minimum and/or maximum threshold values of the one or more metrics.

In a development, the predefined response pattern is defined by a statistical distribution.

In a development, the computer logic is configured for testing one of a failure, a tampering and an ageing.

There is disclosed a silicon integrated circuit comprising a PUF and an online test circuit, said online test circuit comprising one or more circuit parts being physically adjacent to said PUF and said one or more circuit parts being adapted to select a metric associated with an embedded test or online test being embodied in a test circuit adjacent to said PUF; to select one or more thresholds associated with said metrics; and to determine one or more challenges associated with said PUF.

There is disclosed a method of handling a PUF comprising the steps of selecting a metric associated with an embedded test or online test being embodied in a test circuit adjacent to said PUF; selecting one or more thresholds associated with said metrics; determining one or more challenges associated with said PUF.

In a development, a challenge is a service challenge which delivers a service response allowing the PUF to detect an abnormal behavior.

In a development, a challenge is a service challenge which is used to assess one or more quality property of the PUF.

In a development, a challenge is a service challenge which is not an application challenge, wherein an application challenge provides a response for key generation or for challenge-response authentication and wherein an application challenge relies on the uniqueness property of the PUF.

In a development, a challenge is a service challenge which is a challenge which is not designed to necessarily inform about the uniqueness of the PUF.

In a development, a challenge is a service challenge which is associated with a response, which response is associated with a specific, known and reproducible behavior of the PUF.

In a development, the method further comprises the step of running the PUF with said one or more challenges.

In a development, the method further comprises the step of receiving one or more responses associated with said one or more service challenges.

In a development, the method further comprises the step of applying the selected metrics with the selected thresholds to the one or more received responses.

In a development, a global PUF failure is determined upon detection of at least one singular response.

In a development, a singular response is selected from the group comprising one abnormal response in excess of a predefined threshold, a response with invariant and/or predefined bit values, an abnormality in the distribution of responses or a response being incoherent with other received responses.

In a development, a property of the quality of the PUF associated with entropy and/or randomness is determined upon detecting one or more systematic bias enabling an attacker to predict one or more responses of the PUF.

In a development, said detection of one or more systematic bias comprises performing one or more steps associated with standardized tests comprising a mono-bit test, a run test, a pattern test or a combination thereof, said tests being run on responses considered as reliable.

In a development, said detection of one or more systematic bias comprises detecting successive bit values in excess of a predefined threshold.

In a development, a property of the quality of the PUF associated with steadiness is determined by performing the steps comprising receiving a plurality of responses to challenges, storing and comparing said responses over time and determining one or more parameters associated with said steadiness quality.

In a development, the method further comprises the step of varying the selection of service challenges so as to maximize the number of hardware parts of the PUF being involved in the run of said service challenges.

In a development, determining a property of the quality of the PUF associated with reliability comprises the steps of determining a reliability map comprising a bit vector, wherein a bit of said vector equals the value of 1 if the corresponding challenge is determined as reliable in accordance with a predefined threshold and else equals the value of 0; comparing said computed map to a predefined reference map.

In a development, a tampering is determined upon detecting that a challenge determined as unreliable becomes reliable.

In a development, the method further comprises the step of storing said received response values and of comparing said response values one with another.

In a development, the step of comparing responses comprises the step of determining the gradient of two successive responses or the step of determining the average and standard deviation of the received responses.

In a development, the method further comprises one or more steps among revoking the PUF, disabling the PUF or emitting a notification or alert message.

There is disclosed a computer program comprising instructions for carrying out one or more steps of the when said computer program is executed on a suitable computer device.

There is disclosed a silicon integrated circuit comprising a PUF and an online test circuit, said online test circuit comprising one or more circuit parts being physically adjacent to said PUF and said one or more circuits embodying one or more steps of the method.

In a development, a challenge is a service challenge which delivers a service response allowing the PUF to detect an abnormal behavior.

In a development, a challenge is a service challenge which is used to assess one or more quality property of the PUF.

In a development, a challenge is a service challenge which is not an application challenge, wherein an application challenge provides a response for key generation or for challenge-response authentication and wherein a service challenge relies on the uniqueness property of the PUF.

In a development, a challenge is a service challenge which is a challenge which does not inform about the uniqueness of the PUF.

In a development, a challenge is a service challenge which is associated with a response, which response is associated with a specific, known and reproducible behavior of the PUF.

In a development, said one or more circuit parts are adapted or suitable to run the PUF with said one or more challenges.

In a development, said one or more circuit parts are suitable or adapted to receive one or more responses associated with said one or more service challenges.

In a development, said one or more circuit parts being are suitable or adapted to apply the selected metrics with the selected thresholds to the one or more received responses.

In a development, a global PUF failure is determined upon detection of at least one singular response.

In a development, a singular response is selected from the group comprising one abnormal response in excess of a predefined threshold, a response with invariant and/or predefined bit values, an abnormality in the distribution of responses or a response being incoherent with other received responses.

In a development, a property of the quality of the PUF associated with entropy and/or randomness is determined upon detection of one or more systematic bias enabling an attacker to predict one or more responses of the PUF.

In a development, said detection of one or more systematic bias comprises the execution of one or more tests amongst a mono-bit test, a run test, a pattern test or a combination thereof, said tests being run on responses considered as reliable.

In a development, said detection of one or more systematic bias comprises the detection of successive bit values in excess of a predefined threshold.

In a development, a property of the quality of the PUF associated with steadiness is determined by the reception of a plurality of responses to challenges, the storage thereof, and the comparison of said responses over time the determination of one or more parameters associated with said steadiness quality.

In a development, the selection of service challenges maximizing the number of hardware parts of the PUF being involved in the run of said service challenges.

In a development, the determination of a property of the quality of the PUF associated with reliability comprises the determination a reliability map comprising a bit vector, wherein a bit of said vector equals the value of 1 if the corresponding challenge is determined as reliable in accordance with a predefined threshold and else equals the value of 0; and the comparison of said computed map to a predefined reference map.

In a development, evidence of tampering is determined upon detection that a challenge determined as unreliable becomes reliable.

In a development, received response values are stored and compared one with another.

In a development, the comparison of responses comprises the determination of the gradient of two successive responses or the determination of the average and standard deviation of the received responses.

Advantages are now discussed.

Advantageously, using different sets of service challenges allows a user or a machine to better characterize the PUF. Properties of the PUF can be determined by running a collection of challenges. In other words, advantageously, embodiments of the invention allow a user of a PUF to assess the "quality" of the PUF (or properties thereof).

Quality properties of a PUF comprise properties such as steadiness, reliability over time, randomness, failure or tampering detection.

Advantageously, embodiments of the invention can be applied to "silicon-PUFs" (but some embodiments of the invention can be applied to a PUF manufactured according to other technologies as well). The term "silicon" generally designates "semi-conductor". This family of PUFs uses the process variation introduced during the manufacturing stage of CMOS integrated circuits. For example, the difference between the transistors making up the circuits is significant from one circuit to another, even if they form part of the same die. The silicon PUF family comprises notably delay PUFs (Arbiter PUFs, Ring Oscillator PUFs or RO PUFs, Loop PUF, etc.) and memory PUFs (SRAM PUFs, butterfly PUF, etc.). Silicon PUFs may be implemented in ASIC or FPGA circuits without any technological modification.

A delay PUF is a PUF which accepts many challenges. For example, in a delay PUF, the delay is controlled by the challenge bits thus providing a huge number of challenge combinations. Hence delay PUFs comprise PUFs such as Arbiter PUFs RO-PUFs or Loop PUF.

A memory PUF is associated with a limited number of different challenges. For example a memory PUF can be a SRAM PUF. In such a case, the memory addresses can be used as challenges.

Advantageously embodiments of the invention can also be applied to a so-called "composite" PUF which is a combination of memory and delay PUFs.

Advantageously and noticeably, embodiments of the invention can use any type of PUF, be it a memory PUF or a delay PUF. Quality tests according to the invention generally do not discriminate among the internal structures of PUF. Some specific tests can be better performed on certain types of PUF structures. Some specific tests can be performed on certain specific structures i.e. PUF types. For example, the assessment of a reliability of a PUF can require handling an integer (and not a binary value) in order to analyze the deviation of a response compared to a reference.

The FIG. 1 illustrates an aspect of distinction made by the invention about application challenges and service challenges.

A PUF 110 is a device which a) receives a "challenge" 100 (i.e. a bitstring or string of bits) as an input, which b) calls some internal structure (e.g. different depending the PUF is an Arbiter PUF, a Ring Oscillator PUF, a Loop PUF, an SRAM PUF, etc.) and c) whose output is a "soft" response 111 (e.g., a delay or a set of delays), which is eventually "latched" (or "stored" or "registered") to produce a "hard device" 120 under the form of a "response" 121 (bitstring).

In an aspect of the invention, there is measured some intermediate "soft" variables 112 out of the "soft" response 111, and metrics 130 are the derived from them.

These measures or metrics 130 are performed on PUF responses. More precisely, measures or metrics are performed on "soft" PUF responses 111. A "hard" response corresponds to the information 121 returned by the PUF, i.e. a response containing only identification information. A "soft" response corresponds to the "full" or "entire" response, which can possibly contain attributes usable for quality assessment. A soft response comprises information associated with an attribute (for example a "quality" attribute in the present case, i.e. the level of trust one can have in the considered PUF).

In an optional embodiment, a feedback 113 emanating from the estimation of metrics 130 can allow to improve the capture of the "soft" response 111 (for example with such a feedback, the administrator can identify other (e.g. improved) service challenges to differently (e.g. better, more completely) characterize the PUF). The more the feedback is used, the more accurate the soft response can be estimated by the module 130, hence the more reliable the metrics it evaluates. This possibility of embedding a feedback loop is especially useful for applications which require a high confidence in the security metrics.

FIGS. 2A, 2B, 2C and 2D show examples associated with application challenges and services challenges.

Figure 2A:
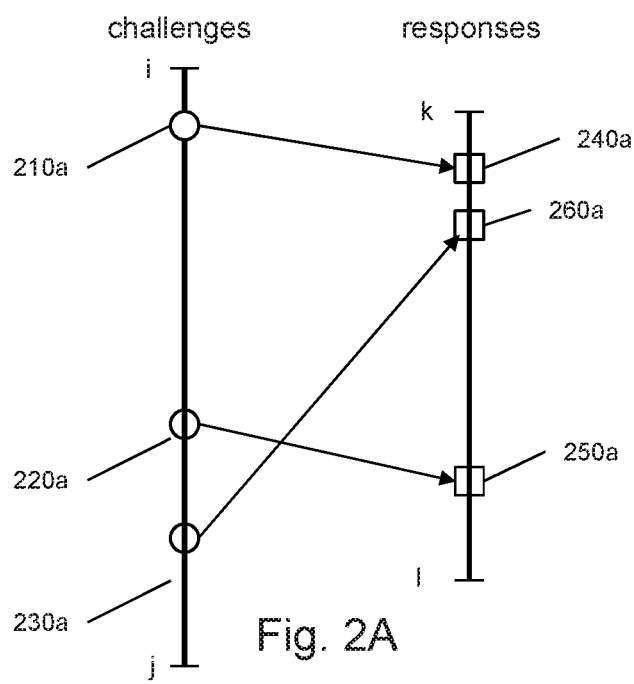
FIG. 2A represents an application challenge and an application response.
Figure 2B:
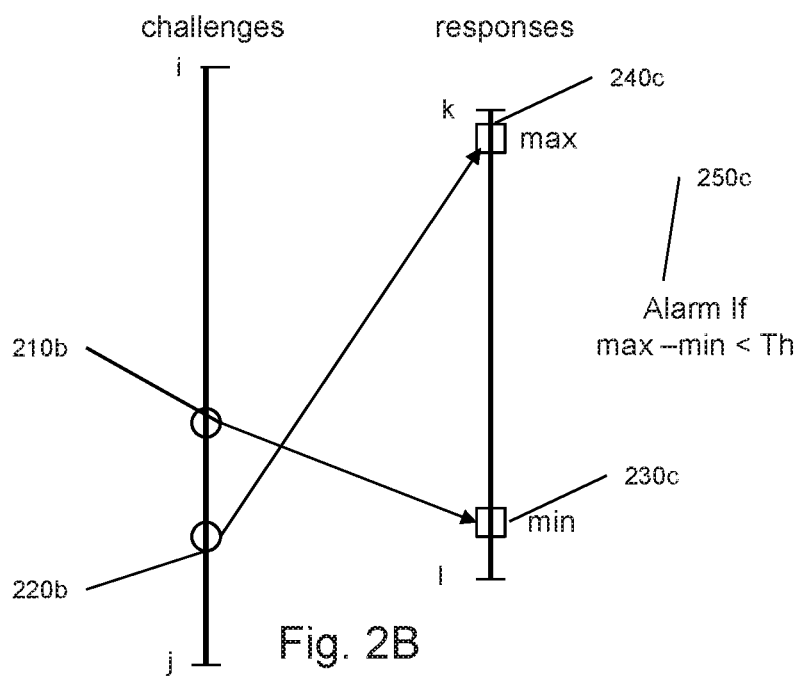
FIGS. 2B, 2C and 2D represent three examples of service challenges and service responses.
Figure 2C:
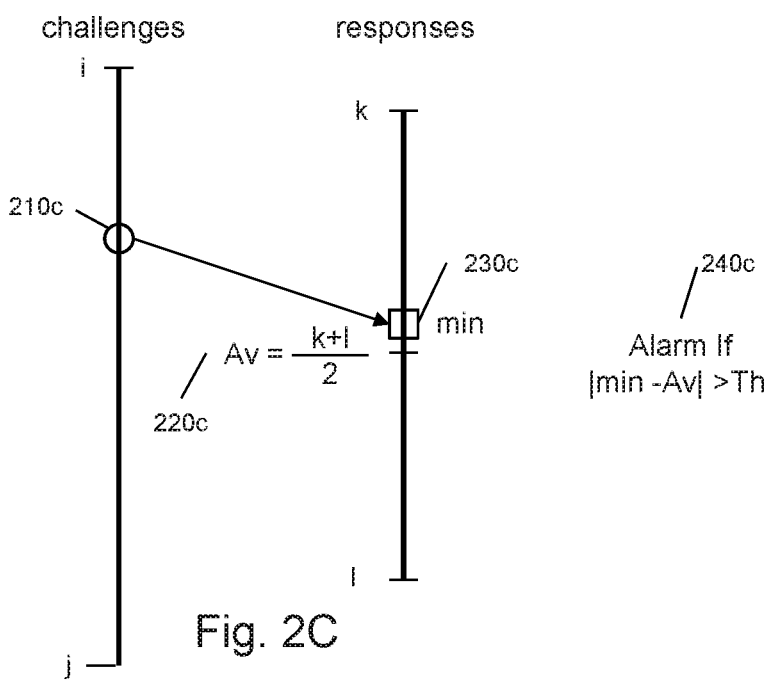
Figure 2D:
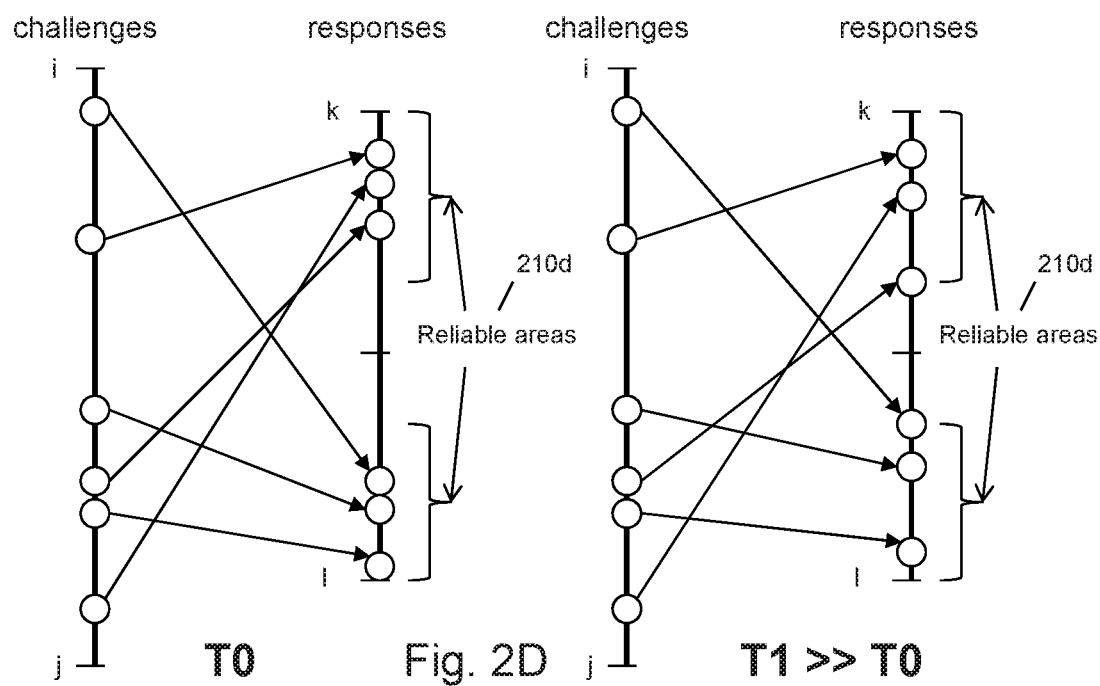

The FIG. 2A illustrates an application challenge and the corresponding PUF response. FIGS. 2B to 2D illustrate embodiments of service challenges.

In the application challenge of FIG. 2A, a definite challenge 210a, 220a, 230a comprising a binary value in a validity interval (I, j) triggers a single definite soft response 240a, 250a, 260a, respectively, in a validity interval (k, l). In other words, there are as many soft responses as there are application challenges.

By contrast, in the service challenge of FIG. 2B, which represents a failure test, challenges 210b, 220b are those corresponding to a minimum (min) response 230b (soft response) and a maximum (max) response 240b (soft response). In addition to these two values, the service (soft) response corresponding to this failure can lead to the triggering an alarm if the difference (max−min)<Th, where Th is a threshold, which may be set to a predetermined fixed value or context dependent. There are therefore, in this example, three soft responses (230c, 240c, 250c) for two service challenges 210b, 220b.

Likewise, in the situation of FIG. 2C, which represents a tampering test, one service (soft) challenge/response pair is represented (210C, 230c). It represents the most unreliable pair as the response value (min) is very near the average value Av=(k+1)/2 (220c) of the validity interval ([k,l]. If ever the service response is above a determined threshold, or |min−Av|>threshold, an alarm (240c) can be triggered. This alarm for example can detect a potential tampering attack as moving from an unreliable to a more reliable state can be the sign of a manipulation.

In the situation illustrated FIG. 2D, which represents an ageing test, one of the service (soft) responses (210d) determines if the response is or is not in the reliability area at a time T1 posterior to T0. Reliable areas (which can be quantified) can evolve or drift over time indeed.

In such embodiments, computer logic embedded in the "on-line" or "on-chip" test circuit (or stored on it, or accessible by it) is configured for implementing a service challenge, a service challenge generating a (soft) service response. The existence of a plurality of (soft) service responses can be indicative of a deviation from a predefined response pattern. In other words, the service or soft response generated by a service challenge run by the PUF can be compared to one or more predefined responses to detect one or more deviations.

The service response may be stored on the test circuit for further inspection or an alarm triggered by the response can be sent on-line to a remote monitoring server.

Figure 3:
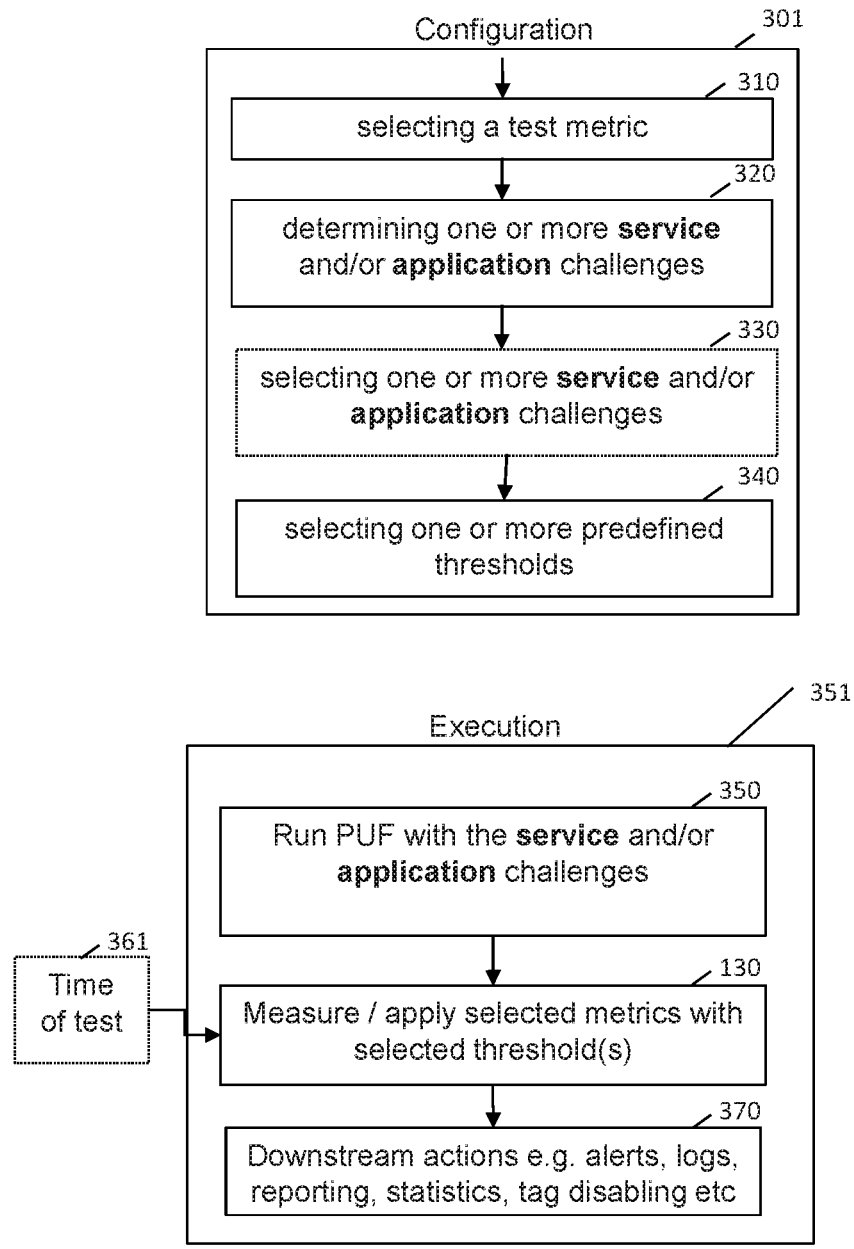
FIG. 3 shows a schematic system view of an embodiment of the invention.

FIG. 3 illustrates examples of steps of the method according to the invention.

In an aspect of the invention, two types of steps can be distinguished: configuration steps 301 and execution steps 351. The configuration steps 301 are generally performed before commercialization, just after the manufacturing stage. For example, an "administrator" user can perform or configure these steps. It allows to characterize and obtain the main parameters of each test. The execution phase 351 is performed by a specific block "online test" or "embedded test" described hereinafter and is active during the PUF life. In some situations, a "end user" can perform these steps.

Configuration steps 301 are first described.

In a step 310, there is determined and/or selected a test metric (amongst predefined metrics).

In an embodiment, said test metric is generally selected by a user (i.e. an administrator): from his know-how, for example from his knowledge of circuits and associated attacks, the user selects from a range of predefined and known metrics. In an embodiment, for example in a highly automated environment, the test metrics are automatically selected (i.e. by machines) according to certain predefined criteria. In an embodiment, the test metric is selected according to human decision with computer aid.

A metric is a criterion (plural metrics/criteria). For example, a metric or criterion is related to the level of randomness, steadiness, reliability over time, detection of failure, detection of tampering. "Selecting a metrics" means "selecting a criterion or quality property among predefined quality properties or criteria"

In a step 320, service challenges are determined along application challenges. In some embodiments, challenges are predefined (they are accessible in libraries or are retrieved from a database). In an embodiment, challenges are created ad hoc. In an embodiment, challenges are classified into one or the other category. In an embodiment, these service challenges are predefined or are available or are accessible.

In an optional step 330, a selection is performed among the service and/or application challenges. Particular tests 302 are described hereinafter.

In a step 340, associated with the selected or the determined metrics, one or more thresholds are defined or determined or selected.

Further to configuration steps 301 (generally handled by an administrator), execution steps 351 (generally handled by an end-user) comprise several steps.

In a step 350, the PUF is exercised or run or executed with the one or more challenges. In response to said exercise, one or more responses are received, and optionally stored.

In a step 130, the metrics is then applied as well as the selected thresholds if applicable. A measure or reading is performed. As a result, certain properties such as steadiness, reliability, randomness or diffuseness of the PUF can be determined.

In a step 370, further downstream actions can be taken (by man and/or machine). For example, alerts, alarms, logs, reports, statistics can be produced and otherwise managed for further decisions. For example, excessive values or results or responses can be reported to a supervision center for statistical purposes. The reliability of PUF can be further increased by replaying its challenge/response protocol and/or by choosing new parameters. A tag embodying the PUF can be recalibrated (e.g. new profiling). A backup spare PUF can be used. A tag can be disabled due to aging or the suspicion of an attack, etc.

Figure 4:
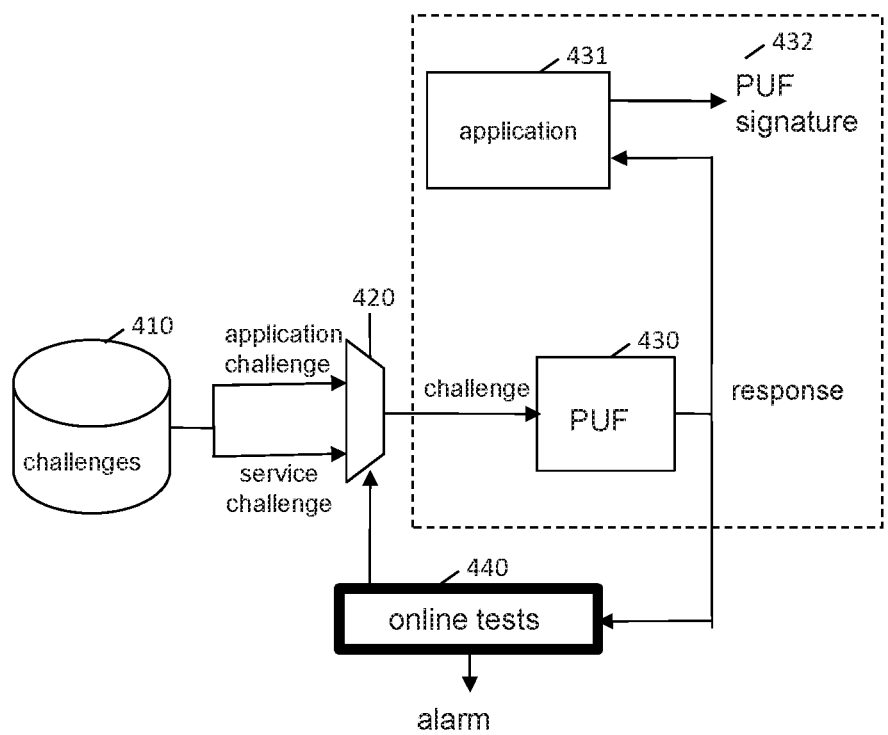
FIG. 4 shows a schematic system view of an embodiment of the invention.

FIG. 4 shows a schematic system view of an embodiment of the invention.

The figure shows a plurality of circuits: a database of challenges 410 comprising application challenges and service challenges, a multiplexer 420, a PUF 430 (embodied in a circuit) and a test circuit 440/steps 130 (embodying one or more tests according to the invention in order to determine quality properties of the PUF).

The database 410 of challenges is accessed by the multiplexer 420, which selects and communicates one or more selected challenges to the PUF 430. Said PUF 430 outputs a response which is collected by the test circuit 440 (steps 130), or alternatively/concomitantly which outputs a signature (when the challenge is an application challenges, i.e. outputs a fingerprint for key generation or challenge-response authentication).

According to an embodiment of the invention, the tests are performed are "embedded" or "online". Tests according to the invention are "embedded tests".

The term "embedded" can be substituted by "online" most of the time.

The meaning conveyed by the term "online" or the term "embedded" is that the test circuit is placed in the direct vicinity or immediate physical proximity of the PUF circuit. In some embodiments, the test circuit is located (e.g. distributed around, placed on top or beneath, gathered in a block adjacent to, etc.) at short distance (e.g. compared to the size of the entire circuit, with respect to proportions and/or dimensions of the PUF circuit, etc) as to impede or to significantly reduce potential physical attacks (as intrusive attacks can at least attempt or succeed to "control" or "falsify" or "modify" or "hijack" or otherwise modify the test or "force" the test result. These types of attacks are facilitated when the communication channel is located outside the device. With an embedded implementation, also combined with the use of service challenges, attacks become significantly more difficult (e.g. some intrusivity is required, particular devices are required to conduct attacks, etc). Therefore, embodiments of the invention are advantageous to better characterize the PUF and protect it.

As a matter of definitions, according to some dictionaries, the term "online" pertains to the operation of a functional unit when under the direct control of the system with which it is associated. In an embodiment, the test circuit controls the PUF. In an embodiment, the test circuit interacts with the PUF. According to another definition, on-line units are available for immediate use on demand by the system without human intervention. According to some embodiments of the invention, the online test circuit is available for immediate use on demand, either by man and machine (e.g. some hardware and/or software elements can trigger the PUF run and the execution of one or more tests)

As a matter of correspondence between space and time, a short distance between the PUF circuit and the respective test circuits implies a low latency, which in turn conveys the meaning of a "real-time" behavior of the combination PUF/test circuit (i.e. a rapid or fast response, not in the meaning usually devoluted to this term in computer science).

Another qualification of the functionality of the combination PUF/test circuit in some cases can correspond to the expression "on-the-fly", which conveys the meaning of both rapidity and embedding. Information (here responses) can be leveraged "on-the-fly" so that conclusions (metric, measurements, alarms) can be taken shortly after.

In computer technology, the term "online" designates the state or condition of a device or equipment that is under the direct control of another device. The term also designates the status of a device that is functional and ready for service. In some variants, the term designates a hardware circuit that is a part of, or is embedded in, a larger entity and that interacts in real or near-real time with the entity.

In an embodiment, an "online" or "embedded" test comprises means or circuits necessary and sufficient to test the PUF. In an embodiment, the test is "internal" or "embedded", i.e. there is no need for external measurement apparatus.

Moreover, a physical placement at short distance advantageously implies a low latency and allows the circuit to receive an alarm in a very fast way. A physical placement at short distance advantageously implies a low latency. A physical placement at a short distance also allows for many connections between the PUF and the test block whilst reducing the complexities of physically routing the individual connections on the integrated circuit.

The term "online" in the context of a "PUF run online" ("run the PUF with a challenge online") means that a measure (or a "reading") is performed wherein the test block (the physical circuit) is provided adjacent to the circuit embodying the PUF ("embedded").

In an embodiment, the method can be implemented by an entirely embedded hardware block. In an embodiment, the disclosed method can be performed by embedded hardware and software running on a local processor. Method steps indeed involve operations (and thus the flow of time) which are performed in certain tangible hardware which can either be custom hardware or local processor running embedded software. In other words, one or more hardware circuits do "embody" predefined method steps.

For example, the block 440 (e.g. steps 130) encodes one or more steps as defined by the invention. From a technological perspective, the block can be intangible (i.e. does not evolve over time, at least not with intention) or can be reprogrammed.

In an embodiment, test means are entirely hardware (e.g. test circuit which is "online" i.e. embedded or physically adjacent or at short distance of the hardware embodying the PUF). In an embodiment, test means combine hardware and software means running on a local processor.

Advantageously, embodiments of the invention can be performed at the factory or on commercialized circuits.

Examples of tests are now described.

In an embodiment, a specific quality property of the PUF is determined. The corresponding quality test is a "total failure test". This test for example verifies that the PUF is not out-of-order. Advantageously, delay PUFs can be tested. A large set of challenges is typically available for those PUFs. Among this set of challenges, a limited number of service challenges with identified properties is selected. Said identified properties correspond to specific (values) of responses. In an embodiment, singularities are detected among received response values. Qualitatively, said responses can be "atypical" and/or "abnormal" and/or "excessive" and/or "convergent" and/or "extreme" and/or otherwise "pathological".

Quantitatively, corresponding determination or selection criteria comprise a) the identification of invariant vectors of bits like 00000000 or 11111111, b) the detection of response values above a predefined upper threshold (e.g. presenting the highest or lowest response values among the received and/or collected responses if applicable); extreme values can be considered or ranges of extreme values c) challenges and/or responses which are too close from one another or which are identical d) intermediary situations in which no coherent response values are received e) more generally the use of statistics which can be applied on the flow of received responses to detect "singularities".

Such embodiments of the "total failure test" can be advantageous in several contexts or scenarios. For example, a hostile attack of the circuit can be detected (e.g. on a multiple Ring-Oscillator-based system by electromagnetic coupling). It also allows the circuit to detect a fault injection attack. For example some registers can be manipulated in order to find a weakness. It also allows the circuit to detect fatal interconnect failures in field-programmable gate arrays (FPGAs) due to local aging phenomenon. It can also detect the alteration of circuits by Focused Ion Beam (FIB) or similar invasive techniques.

In another embodiment, the quality property corresponding to "entropy" or"randomness" can be tested or otherwise assessed. "Randomness" means that the entropy of the PUF response is optimal, meaning that distribution of the PUF responses is uniform when all the challenges are run. In other words, the entropy of PUF is N bits if the response length is N bits.

Typically, memory or delay PUFs can be addressed (a large set of addresses/challenges is then available). In the case of a memory PUF, a subset of addresses can be selected. In such a case, if the considered PUF is based on a SRAM-PUF for example, a service challenge set can be composed of one or many address ranges (a single memory address; a group of consecutive memory addresses i.e. one address range; or a plurality of address ranges). In the case of a delay PUF, there can be selected a limited number of service challenges. After execution of the different challenges, responses are collected or received and further analyzed.

It is ideally expected to get uncorrelated responses and a high entropy level (modulo the imperfections of PUFs which can imply the use of associated thresholds to define the normal range of behavior).

Optionally, one or more tests can be performed on a sequence of responses (i.e. PUFs responses—as vectors of bits—can be concatenated to form a single string of bits).

A series of steps corresponding to quality tests can be applied in order to evaluate the level of entropy.

Some unitary steps are known in the prior art per se but not in the context of the invention. For example, tests from the published proposal referenced AIS31 from BSI (acronym in German for "Bundesamt für Sicherheit in der Informationstechnik"), which is readily available at the URL: https://www.bsi.bund.de/SharedDocs/Downloads/DE/BSI/ Zertifizierung/Interpretationen/AIS_31_Functionality_ classes_for_random_number_generators_e.pdf These tests are thus available and sufficiently documented in the state of the art.

An example of such a unitary test is the so-called "mono-bit" test. In substance, it can be made sure that randomness is not below a "dangerous" level (corresponding to a predefined threshold). As another example, performing a "run" test, it can be made sure or reasonably certain that the number of successive bit values equal to zero is not above a "dangerous" level (i.e. in excess to predefined threshold). In another example, performing a "pattern" test (e.g. "block" test, "disjointness" test, "poker" test, etc. . . . ), It can made be sure that the PUF does not present a major or a significant bias which can help an attacker to predict one or more responses. With respect to these tests, particular metrics can be defined and computed. Corresponding alarms can be notified accordingly.

These standardized tests (e.g. mono-bit test, a run test, a pattern test or a combination thereof) are run on responses considered as reliable, said responses corresponding to service and/or application challenges.

Furthermore, steps of these unitary tests or unitary tests as a whole can be further combined with one another.

In some embodiments, corresponding tests can be performed when prototyping, at factory profiling or after deployment ("on site").

At least some of the embodiments described above can be used advantageously in several contexts or scenarios. For example, it allows the circuit according to the invention to detect a major bias in the structure. It also permits the detection of a major bias in a sample or PUF, for example due to inconsistencies of the manufacturing process. It can also allow the circuit to detect a manipulation performed by an attacker, like a disrupting phenomenon.

In another embodiment, the quality property of "steadiness" is tested. "Steadiness" or "reliability" means that the PUF always provides the same response for a given challenge, thus making evidence of noise immunity.

In an embodiment, there is tested "steadiness without profiling step". PUF responses are generally considered without prior quantification. Some PUFs (usually delay PUFs) deliver an integer quantity, instead of a single bit. An additional process or step can be needed to get from it the desired bit: the quantification. Usually determining this quantity (before quantifying it) can provide some clues or indications about the "reliability" or the "steadiness" of the PUF.

In the case of a delay PUF, a large set of challenges can be available. For some PUF types (like delay PUFs), the response is not a binary but an integer which "contains" the reliability level.

In an embodiment, among the set of possible challenges, there is selected a subset of service challenges presenting identified properties.

In an embodiment, the selection of this subset optimizes the "coverage" of the PUF components. When a challenge is run indeed, only a part of the PUF hardware components i.e. circuit can be used. To some extent, a challenge corresponds to a PUF "configuration". The challenges from the service subset have tentatively to cover all of the PUF "configurations" in order to test the maximum number of the PUF components. Said "coverage" in turn can be (at least partly) quantified and/or optimized.

Depending on the PUF architecture, a well-chosen subset of service challenges advantageously allows to grant the reliability with a maximal coverage (i.e., the verification of all the elements constituting the PUF). Challenges which cannot be accepted for the application can be "recycled" for test purposes (for example).

In an embodiment, a plurality of responses is collected for each service challenge. The steadiness of the responses is then being watched or monitored. For example, the different responses are being stored and the succession of the different responses is analyzed, for example by determining the gradient of two successive responses or by computing the average and standard deviation of the collected data, or by other statistical analysis (ranging for the mere determination of an arithmetic mean and standard deviation to other advanced statistical analysis techniques). Thresholds (i.e. one or more predefined thresholds, static or dynamic, etc) can be defined and alarms or alerts can be notified if deviations are in excess of those thresholds.

Some embodiments advantageously can be used in several contexts or scenarios. For example, some embodiments allow the detection of attacks (e.g. a hostile attack by fault injection—manipulation of registers—or of a hostile attack on a multiple Ring-Oscillator-based system by electromagnetic harmonics attack). Some embodiments allow the detection of abnormally harshed environmental conditions. In other words, described embodiments allow assessing deviations from a standard and defined behavior (if applicable, measured deviations can indicate that a scenario listed above has occurred).

In another embodiment, the quality property of "reliability due to aging" is assessed. "Reliability over time" or "Aging impact" means that a PUF can be altered over time (e.g. continuous degradation). The aging impact of a PUF corresponds to its ability to perform its required functions under stated conditions for a specified period of time. The reliability due to aging impact of a response can be estimated by using different metrics.

In an embodiment, a metrics called "reliability map" is used. In an embodiment, a map can be a bit vector, wherein each bit provides information about the corresponding challenge, for example value 1 for "reliable" and value 0 for "unreliable". The map can correspond to the set of responses which are the most reliable, according to a predefined threshold. For example, such a threshold can depend on the technology being used in the PUF and/or be based on measurements performed during a factory profiling phase.

Preferably a reliability map is obtained from a PUF which delivers integers, i.e. not a single bit, but a reliability map can be derived from any type of PUF. Such a reliability map can vary over time due to environmental conditions (e.g. temperature, power supply, electromagnetic interference, internal noise, etc) but a severe reliability drop can be detected (for example thanks to a Hamming distance/weight computation between a reference reliability map and a measured one). Corresponding alarm flags can be raised.

Some advantageous embodiments or scenarios of use are now described. In a first scenario, the computed reliability map is compared to a reference map (for example during the factory profiling step). If the difference is significant (for example if a Hamming or editing distance between the reference map and the computed map is greater than a predefined threshold), this can indicate that the PUF presents a severe degradation in quality. The sample or PUF should be rejected by the operator. In a second scenario, if the number of unreliable challenges exceeds an upper "dangerous" limit (e.g. the reliability map Hamming weight is being greater than a predefined threshold), then the sample or device should be rejected/revoked by the operator). In a third exemplary scenario, the computed map is used to reject/revoke the deployment of a specific sample, upon detection of a low reliability (for example at the manufacturing factory during the profiling step, it can be determined that the Hamming weight of the computed map is greater than a predefined threshold)

In another embodiment, a "tampering detection test" is performed. A PUF "failure" or "tampering" can happen when extreme or abnormal environment variations (e.g. temperature, power supply, electromagnetic interference) forces the PUF to significantly modify its responses. A PUF tampering for example happens when a malevolent action forces the PUF to output unexpected values.

Delay or memory PUFs can be addressed. A large set of challenges/addresses is therefore available. In an embodiment, the method comprises the steps of determining one or more service challenges as unreliable and/or unstable; wherein an unreliable service challenge is determined as unreliable when the response is sensitive to noise and is unsteady. The tampering can be assessed by a metric which detects that an unreliable challenge becomes reliable. This detection is done if the value is above a predefined threshold.

Advantageously, such embodiments can allow the circuit to detect hostile tampering attack, such as a disrupting phenomenon which forces the PUF response to a constant value In another embodiment, a "performance monitoring" of the considered PUF is performed.

In such an embodiment, the performance of a PUF regarding one or more of its quality properties (e.g. reliability, steadiness, etc.) can be estimated over time. In other words, a plurality of tests described above ("steadiness", "entropy", "aging", etc) can be combined. In an embodiment, the different tests being combined can be weighed according to different ponderation schemes. In an embodiment, a particular combination of tests (or a single test without combination) can be repeated over time and the corresponding evolutions or trends or other indicators can be derived from the history of analyzed results.

In an embodiment, tests on the PUF are run periodically (periodicity can be configurable by the user or dynamically without intervention of a third party).

As with previously described tests, alarms can be raised, notifications or messages can be sent, for example the case of severe performance drops or a contrario upon detection of suspicious performance improvements.

The monitoring of performances or quality properties can be advantageous in several contexts or scenarios. For example, such a monitoring can allow the circuit to detect hostile tampering attack. It also can allow the circuit to detect a PUF "copycat". Such a PUF copycat corresponds to a PUF which has been "modeled", with a mathematical model which operates like the original, but in a perfect manner, i.e. without any noise, aging, failure flaws. Hence, some of its "weaknesses" or hardware specificities have not been reproduced. In an embodiment, a "copycat" or "(too) perfect" PUF can be detected by the combination of different tests according to the invention.

Figure 5:
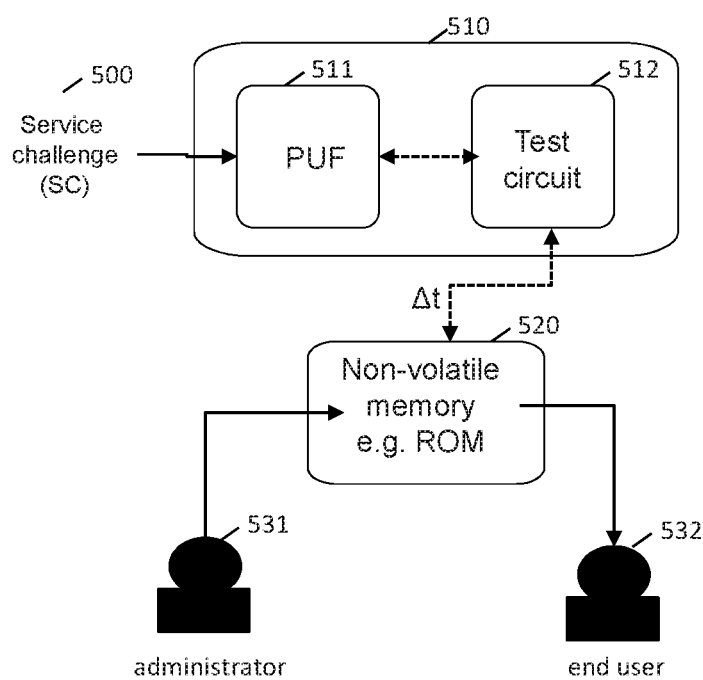
FIG. 5 shows a specific system embodiment of the invention.

The FIG. 5 shows a specific system embodiment of the invention.

The FIG. 5 shows a silicon integrated circuit 510 comprising a PUF 511 and an online test circuit 512 (440, 130), said online test circuit 512 comprising one or more circuit parts being physically adjacent to said PUF 511 and said one or more circuit parts being adapted to select a metrics associated with an embedded test or online test being embodied in a test circuit 512 adjacent to said PUF; to select one or more thresholds associated with said metrics; and to determine one or more challenge associated with said PUF. The determined (service) challenges are run by the PUF and the analysis of (soft) responses enable to qualify or derive quality attributes of the PUF.

The (silicon) integrated circuit 510 comprising a PUF 511 and a test circuit 512, wherein computer logic is one of embedded in, stored on or accessible by the test circuit 512, said computer logic being configured for implementing a service challenge 500, a service challenge 500 generating a service response, which can be compared to one or more responses to determine one or more deviations from a predefined pattern.

The FIG. 5 illustrates a specific embodiment of the invention. In the example, there is received or determined a service challenge (for example configured by an administrator 531 or predefined from a database). Said service challenge is run by the PUF. The obtained (captured) response is stored in a non-volatile memory (e.g. a ROM 520). Another user, for example an end user 532, willing to assess the reliability (or any another quality attribute of the PUF) can later access said non-volatile memory 520 and verify (or otherwise assess or quantify) the attribute of the PUF.

Non-volatile memory, nonvolatile memory, NVM or non-volatile storage is computer memory that can retrieve stored information even after having been power cycled. Examples of non-volatile memory include read-only memory, flash memory, ferroelectric RAM (F-RAM), most types of magnetic computer storage devices (e.g. hard disks) and optical discs. Non-volatile memory comprises ROM (e.g. Mask ROM PROM, EPROM, and EEPROM), NVRAM (e.g. Flash memory, nvSRAM, FeRAM, MRAM, PRAM), mechanical memory (hard drive, optical drive, etc). Non-volatile memory also can comprise CBRAM, SONOS RRAM, racetrack memory, NRAM, Millipede memory or FJG.

The tests being performed and the retrieval of the stored test result(s) are not necessarily coupled. Memory access and test events can occur at different points in time. For example, the access to the stored soft response can occur shortly after the test has been performed, but in some situations said access can occur weeks if not months or even years after (e.g. aging test).

The same user can perform the test and access the stored results. Alternatively, different users (or machines) can successively configure a test, perform it and access results.

The non-volatile memory can be local and/or external. In an embodiment, the non-volatile is exclusively local, i.e. is embedded along the PUF and the test circuit. In an embodiment, the memory is exclusively external (e.g. in such a case, probes or electrodes or electrical junctions provide means to capture and store test results). In yet another embodiment, the memory can be split in both local and external memories (e.g. therefore allowing some form of protection of the locally stored data).

The memory size of the non-volatile memory unit 520 can range from a couple of bits (for example of 256 bits for a failure test, e.g. in an RFID embodiment, providing additionally read and/or write capabilities to the non-volatile memory) to several kilo-bits (for example in order to perform aging tests, wherein drift measurements are determined over time).

Some embodiments of the disclosed invention can be entirely hardware embodiments. Some embodiments can be entirely software embodiments. Some embodiments can contain both hardware and software elements. The invention also can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

The invention claimed is:

1. An integrated circuit comprising:
   a physically unclonable function (PUF) configured to generate a response in response to a challenge input to the PUF,
   a database of challenges, wherein the challenges are partitioned into application challenges and service challenges, a service challenge being different from an application challenge, a multiplexer configured to access to said database to select one or more challenges from the database and communicate one or more selected challenges to the PUF, said selected challenges comprising one or more service challenges, the selected service challenges comprising a number of service challenges that maximizes the number of hardware parts of the PUF involved in the run of said service challenges, and a test circuit adjacent to said PUF;

wherein the PUF is configured to generate one or more application responses relying on the uniqueness property of the PUF for key generation or for challenge-response authentication in response to a selected application challenge, said one or more application responses being used for key generation or for challenge-response authentication;

wherein the PUF is configured to generate one or more service responses in response to selected service challenges, the generated service responses being stored in a memory, said test circuit being configured to determine at least one quality property of the PUF from a deviation determined from said service responses and a predefined response pattern.

2. The integrated circuit of claim 1 further comprising a non-volatile memory configured to store at least one service response, wherein the generated service response is comparable to at least one service response stored in the non-volatile memory.

3. Method of handling a physically unclonable function (PUF) implemented on an integrated circuit, comprising generating a response in response to a challenge input to the PUF, the method comprising:

selecting one or more challenges from a database of challenges, the challenges being partitioned into application challenges and service challenges, a service challenge being different from an application challenge;

communicating one or more selected challenges to the PUF, said selected challenges comprising one or more service challenges, the selected service challenges comprising a number of service challenges that maximizes the number of hardware parts of the PUF involved in the run of said service challenges;

generating, by the PUF, one or more application responses relying on the uniqueness property of the PUF in response to a selected application challenge, said one or more application responses being used for key generation or for challenge-response authentication;

wherein the method further comprises generating, by the PUF, one or more service responses in response to selected service challenges, the generated service responses being stored in a memory, and determining at least one quality property of the PUF from a deviation determined from said service responses and a predefined response pattern.

4. The method of claim 3, further comprising receiving one or more responses associated with said one or more service challenges.

5. The method of claim 3, wherein a global physically unclonable function (PUF) failure is determined upon detection of at least one singular response.

6. The method of claim 5, wherein a singular response is selected from the group comprising one abnormal response in excess of a predefined threshold, a response with invariant and/or predefined bit values, an abnormality in the distribution of responses or a response being incoherent with other received responses.

7. The method of claim 6, wherein said detection of one or more systematic bias comprises detecting if successive bit values exceed a predefined threshold.

8. The method of claim 3, wherein said at least one equality property of the PUF comprises a property associated with the PUF entropy and/or randomness, the method comprising determining said property associated with the PUF entropy and/or randomness if one or more systematic bias enabling an attacker to predict one or more responses of the physically unclonable function (PUF) is detected.

9. The method of claim 3, wherein said at least one quality property of the PUF comprises a property associated with the PUF steadiness, said step of determining the property associated with steadiness comprising receiving a plurality of responses to challenges, storing and comparing said responses over time and determining one or more parameters associated with said steadiness.

10. The method of claim 3, wherein said at least one quality property of the PUT comprises a property associated with the PUF reliability, said step of determining the property associated with PUF reliability comprising:

determining a reliability map comprising a bit vector, the reliability map comprising bit values corresponding to a set of service responses which are the most reliable according to a predefined threshold, wherein a bit of said bit vector being equal to the value 1 if the corresponding challenge is determined as reliable in accordance with a predefined threshold and otherwise equals to the value of 0;

comparing said reliability map to a predefined reference map.

11. The method of claim 10, wherein it comprises detecting a tampering if a service challenge determined as unreliable becomes reliable.

12. The method of claim 3, wherein the deviation is a gradient of two successive service responses, or the average deviation of the service responses, or the standard deviation of the service responses.

13. The method of claim 3, further comprising one or more of following: revoking the physically unclonable function (PUF), disabling the physically unclonable function (PUF), or emitting a notification or alert message.

14. A computer program product stored on a non-transitory computer medium comprising computing instructions for handling a physically unclonable function (PUF), wherein the computing instructions, when executed by one or more processors, cause the one or more processors to:

select one or more challenges from a database of challenges, the challenges being partitioned into application challenges and service challenges, a service challenge being different from an application challenge;

communicate one or more selected challenges to the PUF, said selected challenges comprising one or more service challenges, the selected service challenges comprising a number of service challenges that maximizes the number of hardware parts of the PUF involved in the run of said service challenges;

generate, by the PUF, one or more application responses relying on the uniqueness property of the PUF in response to a selected application challenge, said one or more application responses being used for key generation or for challenge-response authentication;

wherein the one or more processors are further caused to:
generate, by the PUF, one or more service responses in response to selected service challenges, the generated service responses being stored in a memory, and determine at least one quality property of the PUF from a deviation determined from said service responses and a predefined response pattern.

\* \* \* \* \*